INVENTOR.
ANATOL NOVITZKY

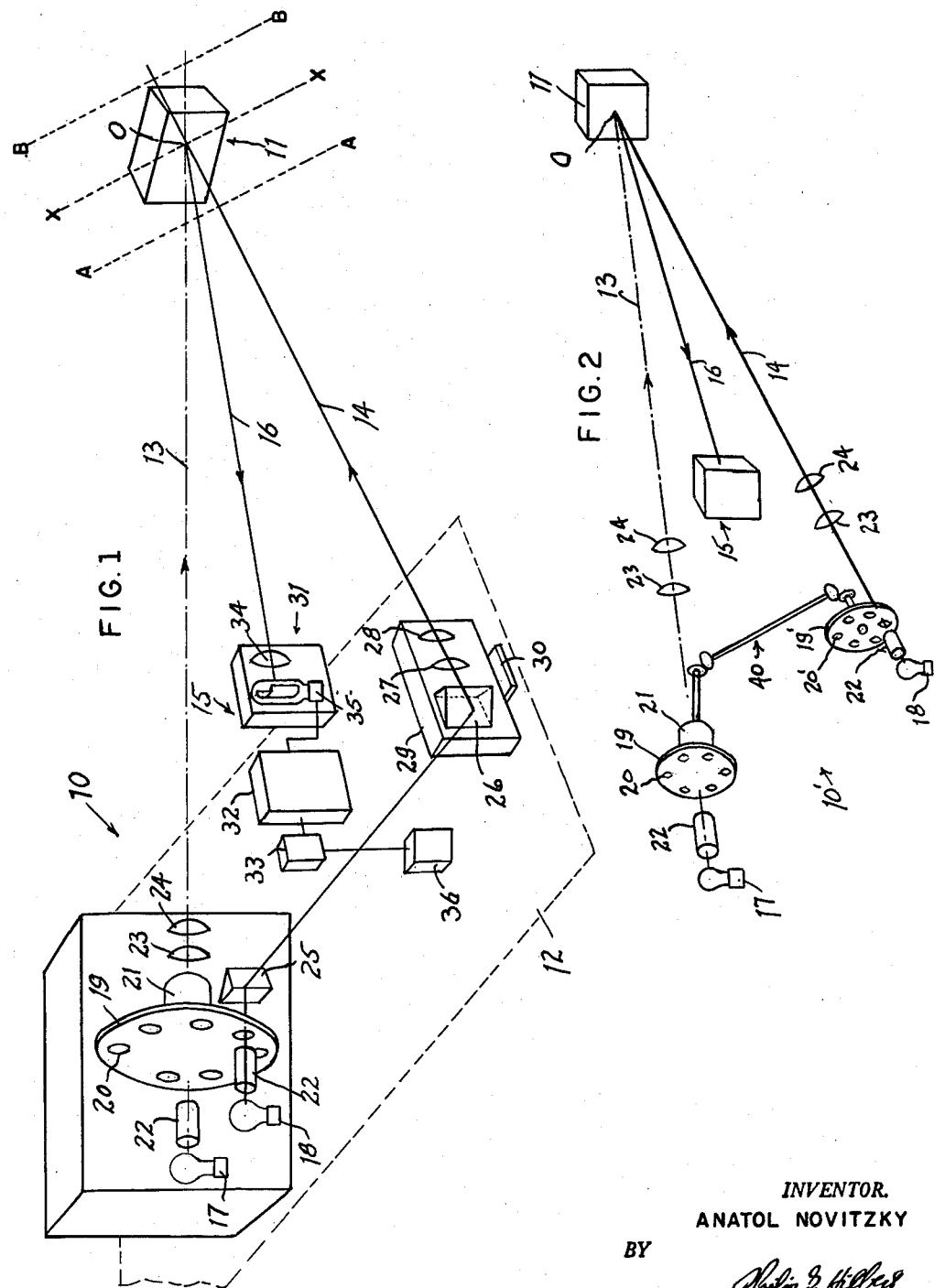

United States Patent Office 3,146,446
Patented Aug. 25, 1964

3,146,446
RANGING SYSTEMS
Anatol Novitzky, 788 Columbus Ave., New York, N.Y.
Filed Mar. 24, 1960, Ser. No. 17,309
16 Claims. (Cl. 343—15)

This invention relates to ranging or remote object detecting systems, and more particularly, concerns apparatus which detects the presence of a remote object by sensing electromagnetic waves passing between the apparatus and the remote object.

Ranging and remote object detection has been employed in many fields such as the detection of aircraft under conditions when the same is not visible. More recently, it has been proposed to use ranging and object detection systems to minimize the ever increasing number of automobile collisions. Such proposed systems in a number of instances employ conventional radar systems wherein the radar transmitter and receiver are located on the vehicle. The radar transmitter projects radar signals ahead of the vehicle and the receiver picks up any reflected signals.

Because of the range of the radar system, objects beyond or outside of a given danger zone are detected, giving rise to spurious reflected signals. In order to limit the range of the detecting system and thereby minimize spurious signals, it has been proposed to use infra-red techniques. However, such techniques employ highly complex and expensive optical systems. Even the infrared systems have serious limitations, particularly, the inability to differentiate between an object in the path of a vehicle and an object laterally displaced from said path.

It is accordingly a general object of this invention to provide an improved ranging system which is highly selective in operation.

Another object of this invention is to provide an improved system of the character described, which is relatively simple in construction and operation, and is constituted of inexpensive components.

It is a further object of this invention to provide an improved ranging system for selectively detecting the presence of an object which is disposed in a particular region or at a determined point, said region or point being at a predetermined distance from a base point; said system being operative to ignore objects located outside of said region or point.

Briefly, in accordance with the invention, the ranging system comprises essentially a pair of sources of electromagnetic waves, or the like; the frequencies of the waves from the respective sources preferably being equal. However, means is provided for maintaining such waves from their respective sources in out of phase relationship. Means is further provided for beaming such waves in paths which intersect at a predetermined point or region at a predetermined spacing from the wave sources. Wave detection means is provided for intercepting the composite wave beams, by reflection or otherwise, the detection means being sensitive only to waves having a frequency equal to the sum of the frequencies of the two wave beams.

It follows, that if an object is located at the point or region of intersection of the wave beams, and assuming that the respective frequencies of such beams are equal, then the wave reflected from the object will have a frequency equal to twice that of the individual beams. Objects located in positions other than the intersection point or region, will reflect waves having a frequency of a single beam.

The composite beam of added frequency, directly at the juncture of the single beams, or in reflected form, may pass through appropriate frequency selective means operative only at the added frequency, to operate warning means, brake means or any selected utilization means. While the system is of particular interest in connection with vehicle braking systems; the invention is generally applicable where it is desirable to detect the presence of an object at a predetermined distance and in a predetermined direction relative to a base point.

Other objects of this invention will in part be obvious and in part hereinafter pointed out.

In the drawings,

FIG. 1 is a schematic showing of one embodiment of the invention, wherein the ranging system employs infrared radiation;

FIG. 2 shows in schematic form an alternative embodiment of the invention;

Figure 3:
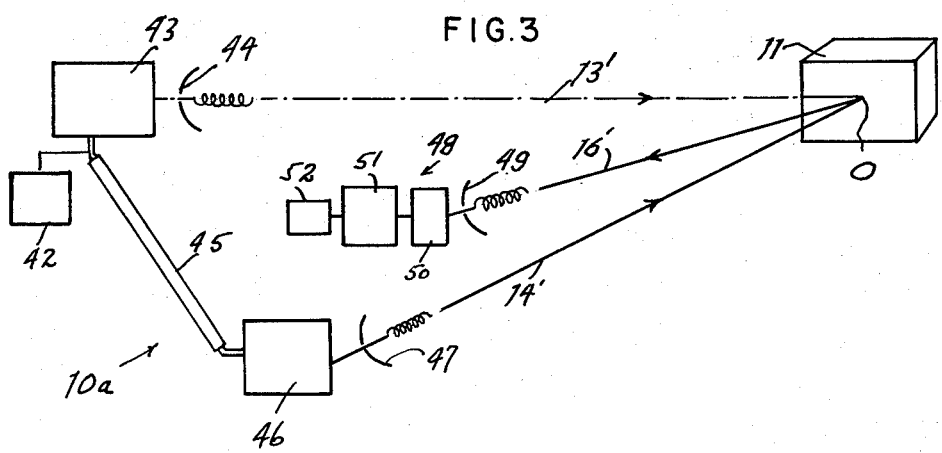
FIG. 3 shows in schematic form, still another alternative embodiment of the invention, using ultra short radio waves.

Referring to FIG. 1, a ranging system embodying the invention, is shown generally at 10. The same is adapted to detect the presence of an object 11 at a predetermined distance from system 10 and in a predetermined direction relative to said system. For the purpose of illustration, system 10 may be located on an automotive vehicle in motion and object 11 may be a second automotive vehicle immediately ahead of the first vehicle. The system 10 including the several pieces of apparatus thereof, may be mounted on suitable support means 12, which is mounted on a front portion of the first vehicle.

Ranging apparatus 10 is operative to transmit converging beams of electromagnetic radiation 13, 14, which may be in the form of infra-red radiation. Beams 13, 14 intersect at a point O along the line X—X. Point O may represent the object to be detected, such as the second automotive vehicle; and is at a predetermined distance from support means 12.

Each of the beams 13, 14 is interrupted at a fixed frequency, say 400 c.p.s., by way of example. However, the interruption of beams 13, 14 is such that pulses of infrared radiation are alternatively received from said beams 13, 14, at the point O. Thus, there is provided at point O a superimposed wave having a frequency of 800 c.p.s. It will be apparent that at any point in either of beams 13, 14, other than point O, the beams at said other points will have the basic frequency of 400 c.p.s. Thus, if object 11 should be located at points in lines A—A or B—B, the wave frequency will be the original 400 c.p.s.

Ranging apparatus 10 further includes means for selectively detecting the superimposed wave produced at point O. Such means comprises an infra-red detector 15, which is aimed at point O to receive the reflected, superimposed wave 16. Said detector is operative to convert the received infra-red wave and to convert the same into electrical signals, as hereinafter described.

More particularly, apparatus 10 comprises first and second sources of light 17, 18, energized from electrical power supply, not shown. A rotatable disc 19 formed with spaced apertures 20, is mounted in front of light sources 17, 18, and is rotated by a motor 21. Light sources 17, 18 are so located relative to each other and to disc 19, that when an aperture 20 of said disc opposite one light source, so as to transmit the light beam therefrom; the other light source has its beam blocked by a non-apertured portion of disc 19.

Collimating means 22 is provided for each of light sources 17, 18, to produce the beams 13, 14 therefrom. Beam 13 is projected through an infra-red filter element 23, to remove visible light therefrom, and then passes through a focusing lens 24, to provide the interrupted, or modulated beam 13 of infra-red radiation.

When light from source 18 passes through its collimating means 22 and an aperture 20 in rotating disc 19, the beam is redirected by a prism 25 to a prism 26, which redirects the beam through an infra-red filter 27 and focusing lens 28 to provide the interrupted or pulsed beam 14. Prism 26, filter 27 and lens 28 are mounted in a suitable housing 29 which may be rotated about a vertical axis, by suitable gear means indicated at 30. Thus, beam 14 may be directed in selected paths which intersect the path of beam 13 at determined points O.

Infra-red detector 15, which is also mounted on support 12, includes transducing means generally indicated at 31, a tuned amplifier 32 and a relay 33. Transducing means 31 comprises a focusing lens 34 and electro-optical transducer 35 for receiving the reflected, modulated beam 16 from lens 34. Transducer 35 may be a phototube, a photovoltaic element, a thermistor or a bolometer.

Transducer 35 converts the infra-red radiation of beam 16 to electrical signals which are supplied to amplifier 32, which may be a conventional vacuum tube or transistor amplifier tuned to a frequency of 800 c.p.s. Amplifier 32 is coupled to relay 33 which controls the operation of an electrically operated utilization device 36, which may be a braking mechanism.

With amplifier 32 tuned to amplify signals of 800 c.p.s. only, it will be apparent, that any wave having a frequency other than 800 c.p.s. will be ignored by the amplifier. Thus, with modulated beams 13, 14 guided in paths which intersect at point O, when object 11 is at said point O, there will be produced the reflected, superimposed wave 16 of a frequency which will be detected and converted into electrical signals for operating mechanism 36. It is understood, that device 36 may also take the form of a warning signal or alarm of the audible or visual type.

Furthermore, if object 11 should be at points other than point O, the beams reflected will have the basic frequency of 400 c.p.s., which beam will leave mechanism 36 inoperative.

FIG. 2 shows a modified form of the invention, wherein apparatus 10' is similar to apparatus 10 shown in FIG. 1, except that each light source 17, 18 has associated therewith a rotating apertured disc 19, 19', respectively. Disc 19' is rotated from disc 19 by a gear transmission 40, which is operative to maintain the discs 19, 19' in out of phase relation insofar as their respective apertures 20, 20' are concerned, thereby providing the pulsed or modulated beams 13, 14 in out of phase relation, for the purpose described above.

In FIG. 3 is shown another embodiment of the invention, wherein electromagnetic radiations of the ultra short wave radio type are used. Apparatus 10a comprises an oscillator 42 for generating electrical pulse signals of a given frequency. Such signals are supplied directly to a transmitter 43 which converts the signals to packets of ultra short wave signals, which in turn are radiated by means of a directional antenna 44 to provide a beam 13' directed to point O.

The pulse signals from oscillator 42 are also fed by way of a delay cable 45 to a transmitter 46, which is similar to transmitter 43. Transmitter 46 in response to the received electric pulse signals, transmits pulses of ultra short electromagnetic waves to directional antenna 47 to provide the radiated beam 14'. The delay cable 45 has a length such that the electric pulse signals received by transmitter 46 are out of phase with those received by transmitter 43.

When object 11 is located at point O, there will be produced a reflected ultra short wave beam 16', which beam 16' is received by a receiver 48 having a directional receiving antenna 49 aimed toward point O. A detector 50 coupled to antenna 49, is connected to a tuned amplifier 51 and utilization means 52 is connected to amplifier 51.

Detector 50 receives the pulses of ultra short electromagnetic wave signals from antenna 49 and converts them to electrical signal pulses. Tuned amplifier 51 receives such signal pulses, and if they have a frequency which is twice the frequency of the signal pulses generated by oscillator 42, amplifies such selected signals for use by utilization means 52. Amplifier 51 will ignore signals of a frequency other than twice that of oscillator 42.

In FIGS. 1, 2 and 3, the apparatus shown has the superimposed wave 16 or 16' in the form of a reflected beam with the receivers 15, 48 remote from point O and aimed at said point O. However, the superimposed wave may be directly detected and utilized at point O, as shown in the embodiments illustrated in FIGS. 4, 5.

Figure 4:
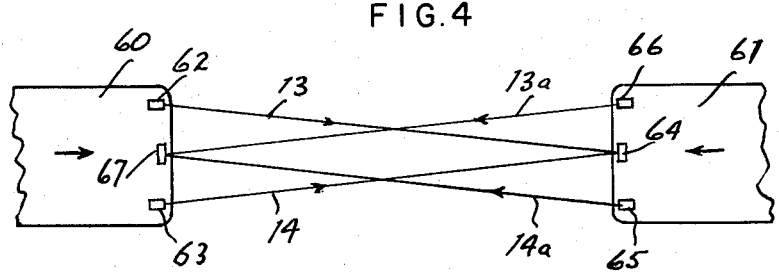
FIG. 4 shows in schematic form, yet another embodiment of the invention.

Thus, in FIG. 4, there is shown automotive vehicles 60, 61 moving toward each other, with an imminent head-on collision in prospect. Each vehicle 60, 61, is provided with a ranging system 10, 10' or 10a, of the type previously described. However, it will be apparent that the beams 13, 14 emanating from the beam sources 62, 63 converge at a point representing a determined minimum distance between vehicles 60, 61. At such point beams 13, 14 will form a superimposed wave directly received by receiver 64 on vehicle 61 for operating the braking mechanism or alarm signal, not shown on vehicle 61.

Similarly, beams 13a, 14a emanating from beam sources 65, 66 will converge and form a superimposed wave which will be directly received by receiver 67 on vehicle 60, causing the operation of its braking or signal mechanism, not shown.

Figure 5:
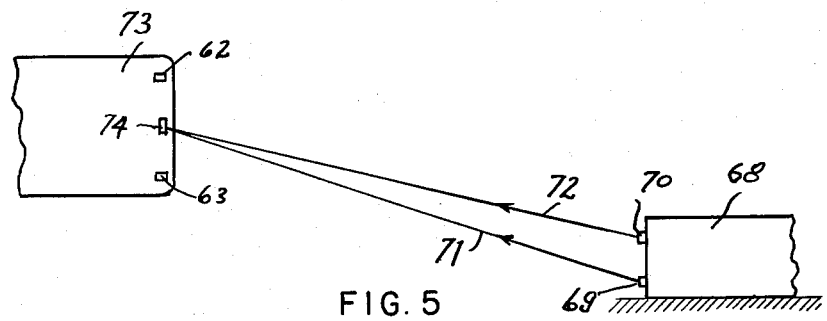
FIG. 5 shows in schematic form, yet a further embodiment of the invention.

Also, as shown in FIG. 5, a fixed object 68, such as an abutment, bridge or the like, may have beam sources 69, 70 providing converging beams 71, 72 modulated, as previously described to form a superimposed wave at their intersection at a predetermined distance from object 68. Thus, a vehicle 73 provided with a selective receiver 74, upon reaching the point of intersection of beams 71, 72, will result in operation of its braking or signal mechanism, as previously described.

The systems and apparatus shown herein may be used for purposes other than to avoid vehicle collisions, and may be adapted for use wherever objects are to be selectively detected when they move into or occupy particular positions relative to another moving or stationary object.

It is understood that the point of intersection O of the pulsed beams relative to the beam transmitters, may be varied by shifting the angular relation of both beam transmitters while leaving the receiver fixed. Alternatively, one beam transmitter may remain fixed while the other is shifted to vary the angular relation of the transmitted beams and thereby vary the location of the point of their intersection. In such case, the receiver is shifted so as to be aimed at the selected point of beam intersection.

It is further understood that the term electromagnetic radiation is employed in its generic sense, including all portions of the spectrum from visible light to the radio waves. Furthermore, the term frequency is to be understood to mean a pulse repetition rate.

While the modulated beams from the pair of transmitters may each have the same frequency, it is understood that the respective frequencies may be different; in either case, the superimposed wave will be of a frequency equal to the sum of the directed beam frequencies.

As various changes might be made in the embodiments of the invention herein shown, without departing from the spirit thereof, it is undertsood that all matter herein disclosed shall be deemed illustrative and not limiting except as set forth in the appended claims.

Having thus disclosed my invention, I claim as new and desire to protect by Letters Patent:

1. Ranging apparatus comprising a first source of pulsating electromagnetic radiation having a frequency of $f'$ pulses per second, a second source of pulsating electromagnetic radiation having a frequency of $f''$ pulses per second, means for guiding the radiations from said first and second sources in constricted beams which are angularly related to intersect only at a region located at a predetermined distance from said sources to form superimposed pulsating electromagnetic radiation at said region having a frequency of $f'''$ pulses per second and constituted of pulsations of frequency $f'$ in interposed relation to pulsations of frequency $f''$, where $f'''$ is different from $f'$ and $f''$, and detecting means operatively disposed for selectively detecting pulsating electromagnetic radiation only having a frequency of $f'''$ pulses per second.

2. Apparatus as in claim 1 wherein said detecting means is remote from and aimed at said region.

3. Apparatus as in claim 1 wherein said detecting means is at said region.

4. Apparatus as in claim 1 wherein said first and second wave sources are sources of infra-red waves.

5. Ranging apparatus comprising a first source of pulsating electromagnetic radiation having a frequency of $f$ pulsations per second, a second source of pulsating electromagnetic radiation having a frequency of $f$ pulsations per second, means for maintaining the electromagnetic radiation of said second source out of phase with the electromagnetic radiation of said first source, support means for supporting said first and second sources at a predetermined spacing, means for aiming said sources so that constricted beams of electromagnetic radiation emanating from said sources intersect only in a region remote from said support means and at a predetermined distance from said support means, the superimposed beams of electromagnetic radiation at said region having a frequency of $2f$, pulsations per second, and means operatively disposed for selectively detecting the superimposed beams of electromagnetic radiation of a frequency $2f$ pulsations per second.

6. Apparatus as in claim 5 wherein said detecting means is located in a position remote from said region and aimed at said region whereby to detect the reflection of electromagnetic radiation having a frequency of $2f$ pulsations per second when an electromagnetically reflecting body is substantially in said region.

7. Apparatus as in claim 6 wherein said first and second sources are sources of radio waves.

8. Object detecting apparatus comprising a support means, a first source of a constricted beam of electromagnetic radiation of a frequency of $f$ pulsations per second, a second source of a constricted beam of electromagnetic radiation of a frequency of $f$ pulsations per second, said sources being disposed on said support means in laterally spaced relation, means for maintaining the radiation beam of the second source out of phase with the radiation beam of the first source, means for directing the beams from said first and second sources in paths which intersect at a point remote from said support means and at a predetermined distance from said beam sources, detecting means including frequency selective means on said support means and aimed at said point for detecting only electromagnetic radiation of a frequency substantially of $2f$ pulsations per second and derived as a radiation beam reflected from an object only when said object is at said point and in the path of the converging radiation beams from said first and second sources.

9. Ranging apparatus comprising support means, a first source of a constricted beam of electromagnetic radiation of a frequency of $f$ pulsations per second on said support means, a second source of a constricted beam of electromagnetic radiation of a frequency of $f$ pulsations per second on said support means, means for maintaining said beams in out of phase relationship, means for directing said constricted beams in converging paths which intersect at selected points remote from said support means, means for controllably directing at least one of said constricted beams to regulate the distance between a selected point and said support means, said constricted beams providing at their intersection a superimposed wave of a frequency of $2f$ pulsations per second, means operatively disposed for selectively detecting said superimposed wave, and utilization means responsive to said detecting means.

10. Ranging apparatus comprising a support means, first and second sources of infra-red radiation disposed on said support means, said sources being arranged to provide radiation beams in converging paths which intersect at a point located at a predetermined distance from said sources, means for interrupting each of said beams to give said beams a frequency of $f$ pulsations per second, means for maintaining said beams in out of phase relationship, said converging beams at their point of intersection forming a superimposed wave of a frequency of $2f$ pulsations per second, infra-red detection means operatively disposed to detect only said superimposed wave, and utilization means responsive to said infra-red detection means.

11. Apparatus as in claim 10 wherein said interrupting means comprises a single rotary, apertured disc arranged to successively interrupt each of said beams, and infra-red optical means for projecting one of said beams in a path in convergent relation to the path of the other beam.

12. Ranging apparatus as in claim 10 wherein said infra-red detection means includes an infra-red transducer operative to convert infra-red radiation to electrical pulses and an electrical signal amplifier tuned to a frequency of $2f$ pulsations per second.

13. Ranging apparatus comprising first and second sources of infra-red radiation in displaced relation, a pair of rotatable apertured discs respectively located to interrupt beams of infra-red radiation emanating from said sources, means coupling said rotating discs whereby said radiation beams are successively interrupted with a frequency of $f$ pulsations per second, means for guiding said interrupted beams in paths intersecting at a point remote from said beam sources and only at a predetermined distance from said beam sources, infra-red detection means operatively disposed to detect a superimposed interrupted beam of a frequency of $2f$ pulsations per second derived from said intersecting interrupted beams, and utilization means responsive to said infra-red detection means.

14. Ranging apparatus comprising an ultra short wave oscillator of frequency of $f$ pulsations per second, a pair of signal transmitters responsive to said oscillator, delay line means coupling one of said transmitters to said oscillator, a pair of antenna means respectively coupled to said transmitters for directing beams of ultra short wave radiation in converging paths which intersect at a region remote from said transmitters and at a predetermined distance therefrom, said beams of short wave radiation being in out of phase relation and producing at said region a superimposed beam of short wave radiation of a frequency of $2f$ pulsations per second, third antenna means operatively disposed to receive said superimposed beam, and signal receiver means coupled to said third antenna and tuned to receive signals of frequency of $2f$ pulsations per second.

15. Ranging apparatus comprising a pair of signal transmitters, means for supplying each of said transmitters with ultra short wave signals of a given frequency, means for maintaining the output of one transmitter in out of phase relation to the output of the other transmitter, means for directing the respective outputs of said transmitters in constricted beams intersecting only at a point at a predetermined distance from said transmitters to proivde a superimposed wave only at the intersection of said beams having a frequency equal to twice said given frequency, means operatively disposed to selectively detect said superimposed wave, and utilization means responsive to said detecting means.

16. Ranging apparatus comprising a first source of pulsating electromagnetic radiation having a frequency of $f'$ pulses per second, a second source of pulsating electromagnetic radiation having a frequency of $f''$ pulses per second, means for guiding the radiations from said first and second sources in constricted beams which are angularly related to intersect only at a region located at a predetermined distance from said sources wherein the pulsations from said second source occur only during the absence of pulsations from said first source to form superimposed pulsating electromagnetic radiation at said region having a frequency of $f'''$ pulses per second, where $f'''$ is different from $f'$ and $f''$, and detecting means operatively disposed for selectively detecting pulsating electromagnetic radiation only having a frequency of $f'''$ pulses per second.

References Cited in the file of this patent

UNITED STATES PATENTS

| | | |
|---|---|---|
| 1,821,921 | Bangay | Sept. 8, 1931 |
| 2,081,134 | Buckley | May 25, 1937 |
| 2,133,241 | Baker | Oct. 11, 1938 |
| 2,176,469 | Moueix | Oct. 17, 1939 |
| 2,259,982 | Alexanderson et al. | Oct. 21, 1941 |
| 2,277,464 | Taylor | Mar. 24, 1942 |
| 2,517,702 | Offner | Aug. 8, 1950 |
| 2,527,547 | Hardy | Oct. 31, 1950 |

FOREIGN PATENTS

| | | |
|---|---|---|
| 803,926 | France | July 20, 1936 |